United States Patent [19]

Thomas et al.

[11] Patent Number: 4,468,230

[45] Date of Patent: Aug. 28, 1984

[54] ACID DYE DISPERSIONS

[75] Inventors: Thomas J. Thomas; Robert G. Hoguet; Charles W. Sandefur; Dietmar Kalz, all of Summerville, S.C.

[73] Assignee: Mobay Chemical Corporation, Pittsburgh, Pa.

[21] Appl. No.: 478,953

[22] Filed: Mar. 25, 1983

[51] Int. Cl.$^3$ .............................................. D06P 67/00
[52] U.S. Cl. ............................................ 8/528; 8/527; 8/557; 8/561; 8/589; 8/618; 8/680; 8/929
[58] Field of Search .................. 8/527, 557, 589, 633, 8/528, 561, 618

[56] References Cited

U.S. PATENT DOCUMENTS

| | | | |
|---|---|---|---|
| 3,770,371 | 11/1973 | Bossard et al. | 8/598 |
| 3,905,949 | 9/1975 | Perkins et al. | 260/143 |
| 4,110,073 | 8/1978 | Mollet et al. | 8/527 |
| 4,264,323 | 4/1981 | Capponi et al. | 8/527 |
| 4,435,181 | 3/1984 | Hoguet et al. | 8/527 |

FOREIGN PATENT DOCUMENTS

| | | |
|---|---|---|
| 2843015 | 4/1980 | Fed. Rep. of Germany . |
| 1001182 | 8/1965 | United Kingdom . |

*Primary Examiner*—A. Lionel Clingman
*Attorney, Agent, or Firm*—Gene Harsh; Lawrence S. Pope

[57] ABSTRACT

The present disclosure is concerned with aqueous dispersions of anionic acid dyes, especially the monosulphonated level dyeing acid dyes, which have low room temperature, low shear viscosities and good storage stability. This low viscosity enables them to be readily poured, pumped and otherwise handled. These dispersions comprise dyestuff solids with a controlled particle size distribution having a median value between about 1 and 10 microns; an anionic dispersant; and an electrolyte. In a preferred embodiment the pH is adjusted to give an optimum viscosity value. Another preferred feature is the adjustment of the rheology with a thickening agent such as xanthan gum. These dispersions find particular utility in the continuous dyeing of carpet, especially in Kuesters or foam dyeing equipment.

39 Claims, No Drawings

ACID DYE DISPERSIONS

BACKGROUND OF THE INVENTION

The well recognized difficulties with powdered dyes have resulted in efforts to formulate various classes of dyes in liquid form. One of the strongest impetuses to this desired for liquid formulations has been the advent of automated metering and handling equipment which greatly reduces the labor required and the potential for error in utilizing dyestuffs in practical applications. Another driving force has been the desire on the part of dyestuff manufacturers to avoid the energy intensive step of drying the wet filter cake which usually results upon isolation of the synthesis product.

Proposals for liquid dye formulations have been made with regard to a number of diverse types of dyes. One of the earliest commercially successful liquid formulations occurred in the field of paper dyes. One of the earliest of these formulations is described in U.S. Pat. No. 3,905,949 and is still on the market today. The approach utilized with these paper dyes was to render the dyestuff molecule sufficiently soluble in water to be formulated in concentrated aqueous solutions. However, this approach could not be readily extended to all types of dyes particularly those which could not be rendered sufficiently soluble to permit the preparation of commercially significant concentration or those which had a tendency to react with water such as the fiber reactive cotton dyes. In these cases it has been proposed to prepare suspensions or dispersions in water.

There has been no commercially successful aqueous dispersion or suspension of anionic acid dyes marketed in the United States. An early proposal described in U.S. Pat. No. 3,770,371 which related to fiber reactive dyes as well as acid dyes involved the addition of sufficient salt to the aqueous suspending media to render the dyes of interest insoluble in combination with the addition of a "stabilizing agent" which was either an anionic or non-ionogenic dispersing agent or surfactant. It appears that the dyestuff was either used as obtained from the filter cake or was subject to very extensive size reduction such as grinding for thirty hours in a glass bead mill. The amount of "stabilizing agent" utilized was evidently dependent upon whether or not the dyestuff was subject to size reduction with stabilizing agent to dyestuff ratios in excess of 20:1 being utilized with the unmilled presscake in contrast to the ratio of 4:1 utilized with the glass bead mill dyestuff formulations. The amount of salt utilized, however, appears to be independent of whether or not the dyestuff was size reduced and independent of the amount of stabilizing agent utilized. The ratio of dyestuff to salt ranged between 1.2 and 2.6. Later workers from the same company, Ciba-Geigy, characterized this approach in U.S. Pat. No. 4,110,073 as being unsatisfactory because "the colloidal-chemical stability of the dispersion is, however, consequently reduced and unstable flocculant dispersions are obtained". They proposed instead uniform extensive size reduction of the dyestuff particles in combination with "anion active dispersing agents". This proposal was reported to have resulted in the formation of fairly concentrated aqueous dispersions which were stable for as long as six months. In particular, these dispersions were reported not to sediment and to maintain their original viscosities after six months room temperature storage. These viscosities were reported to be in the range of between 3 and 500 centipoise, but from the working examples it is evident that this viscosity was measured at infinite shear. In particular, these viscosities were determined in accordance with the technique of "Casson" which is reported in the literature as involving an extrapolation from several measured viscosities at different shear rates to what the viscosity would theoretically be at infinite shear. This technique is described in "Fundamentals of the Rheology of Pigment Dispersions" by W. K. Asbeck appearing at page 65 et seq. of the January, 1961 issue of the *Official Digest*, as well as in the "Measurement of Rheology Thixotropic Organic Coatings and Resins with a Brookfield Viscometer" by Perry E. Pierce appearing at page 35 et seq. of the June, 1971 issue of the *Journal of Paint Technology*.

Dyestuff dispersions prepared in accordance with the U.S. Pat. No. 4,110,073 appear to have limited commercial utility because they have been found to have very high viscosities at lower shear rates. The market is evidently unwilling to accept a product with a low shear viscosity in excess of 10,000 centipoise because of its appearance and difficulties in stirring, pumping, pouring and otherwise handling the product. This high viscosity is evidently the result of both the very small dyestuff particle size and the high surfactant content with dyestuff to surfactant ratios between 5 and 1.75 being utilized.

Certain other proposals have been made with regard to certain other specific classes of dyestuffs. German Offenlegungsschrift No. 2,843,015 proposes the preparation of aqueous dispersions of the more water-soluble fiber reactive dyestuffs by stirring presscake and salt into the water. No dispersant or dyestuff particle size reduction is utilized. On the other hand, U.S. Pat. No. 4,264,323 teaches the preparation of aqueous concentrates in which fairly soluble fiber reactive dyes are subject to substantial size reduction and then added to water containing a high level of an anionic dispersing agent. United Kingdom Pat. No. 1,001,182 describes the formation of a "micro-crystalline suspension" utilizing a metallizable dye ground to a particle size between 2 and 3 microns and approximately 20% of a surfactant based on the weight of the dye. No information is given with regard to the stability of this suspension or its viscosity.

SUMMARY OF THE INVENTION

The present invention involves non-sedimenting stable aqueous dispersions of non-metallizable acid dyestuffs. These dispersions overcome the shortcomings of prior art by carefully controlling all of the formulation parameters including the average particle size of the dyestuff solids utilized in making the dispersion. These dispersions may have a dyestuffs solids content of between about 10 and 60 weight percent; have a room temperature viscosity of less than about 4000 cps as measured with a Brookfield viscometer at 12 rpm; and are stable in field storage. This may be conveniently evaluated by oven-ageing at 50° C. for three weeks. The dyestuff concentrations achievable are high enough to make the dispersions commercially practicable while the low shear viscosities are low enough to be acceptable to the marketplace. The stability to oven-ageing gives assurance that the dispersions will remain stable even under adverse field conditions such as transportation or warehousing where the ambient temperature can exceed 40° C. or 100° F. In these dispersions dyestuff solids having a median particle size between about 1 and 10 microns and a substantial absence of particles of less than 1 micron, are combined with between about 0.1 and 10 weight percent based on the total weight of the dispersion of an anionic dispersant. Sufficient electrolyte may be added to the dispersion to optimize the stability to elevated temperature ageing and to optimize the rheological properties.

DETAILED DESCRIPTION OF THE INVENTION

The preferred aqueous dispersions of the present invention contain between about 14 and 48 weight percent of dyestuff solids; between about 0.2 and 7 weight percent of an anionic dispersant; and between about 0.5 and 16 weight percent of electrolyte. It is preferred to mill the dyestuff solids to a median particle size between about 1 and 5 microns with a value between about 2 and 3 microns being especially preferred while still avoiding the generation of any substantial portion of particles having a size of less than 1 micron. The dyestuff to dispersant ratio is preferably maintained in the range of between about 3.5 and 35 and the dyestuff to salt ratio is preferably maintained in the range of between about 1.0 and 40. In an especially preferred embodiment, the dispersion has a dyestuff solid content of between about 25 and 45 weight percent. An especially preferred dispersant content is between about 0.2 and 3 weight percent.

The low shear viscosities of most of the dispersions of the present invention can be lowered by increasing the pH of the dispersion. Significant decreases in viscosity can be obtained at pH values in excess of about 5 with pH values between about 7 and 10 giving particularly low viscosities at low shear. However, for reasons of commercial acceptability it is generally preferred to stabilize the pH of the dispersions of the present invention at a value of about 7.

A particularly interesting but divergent application of this pH control concept is seen with dispersions based upon Color Index Acid Blue 40. In these dispersions it is preferred to use pH values less than about 7, especially between about 3 and 7. Such dispersions are preferably formulated with between about 7 and 18 wt % of dyestuff solids; between about 0.1 and 3.0 wt % dispersant; and between about 8 and 16 wt % of electrolyte.

A particularly preferred range of pH values between about 4 and 10 and particularly preferred ranges of components have also been identified for certain other dyestuffs. The component ranges and dyestuff identities are as follows:

| Dyestuff Type | Amount of Dyestuff in wt % | Amount of Dispersant in wt % | Amount of Electrolyte in wt % |
| --- | --- | --- | --- |
| Acid Blue 324 (Structure I) | 10–47 | 0.2–8 | 0.5 |
| Acid Red 337 (Structure II) | 10–47 | 0.2–5 | 2–15 |
| Acid Blue 25 (Structure III) | 11–51 | 0.2–5 | 2–12 |
| Acid Orange 156 (Structure V) | 10–35 | 0.2–5 esp. 1.5 | 1–12 |
| Acid Red 266 (Structure VI) | 9–41 | 0.2–5 | 1–7 |
| Structure VII | 10–26 | 0.2–3 | 5–15 |

The dyestuffs suitable for the practice of the present invention are non-metallizible acid dyestuffs. These dyes constitute a recognized class in the art and can be generally characterized as having at least one carboxylate or sulphonate group attached to the dyestuff molecule; having a water solubility in excess of 5 grams per liter; and having a reasonable substantivity for wool or nylon fibers without the aid of either a mordant or complexing with a metal ion. These dyestuffs preferably have a water solubility in excess of about 20 grams per liter, but low enough so as not to adversely affect their substantivity on wool or nylon substrates. In this regard, in the present application dyestuffs solids are referred to without consideration of the fact that a small amount of the dyestuff material may actually dissolve in an aqueous dispersing media. At a solubility in pure water of 20 grams per liter this would introduce an insignificant error of approximately 2% and of corse, in the present dispersions which also contain electrolyte and dispersant any given dyestuff's solubility is very likely to be substantially less than its solubility in pure water. The level dyeing acid dyes recognized by the Third Edition of the *Encyclopedia of Chemical Technology*, edited by Kirk-Othmer, are especially preferred. These dyes are characterized among other things by being monosulfonated. Among these the particularly preferred dyestuffs are those belonging either to the azo or anthraquinone dyestuff classes.

The dyestuffs utilized in the present invention should be ground until they have a median particle size between about 1 and 10 microns and a grinding technique should be utilized which avoids the generation of a substantial number of particles having sizes below 1 micron. It has been found that aqueous dispersions containing substantial amounts of particles with sizes less than 1 micron display excessive low shear viscosities particularly when such aqueous dispersions also contain sufficient dispersant or surfactant to ensure the long term stability of the dispersion. An appropriate particle size distribution can be obtained by subjecting presscake to sequential grinding in a rotor stator mill followed by grinding in a pressure cavitational mill such as is marketed by the Gaulin Corporation. In general, milling in a sand or glass bead mill will result in the generation of unsuitably small particles. A convenient way to prepare dyestuff presscake for grinding or milling is to stir it into an aqueous solution of the electrolyte and dispersant which will form part of the ultimate dispersion. It is preferred to have the electrolyte already dissolved in the aqueous medium before the addition of the presscake because otherwise inconveniently high viscosities may be encountered in the course of processing.

The dyestuff solids should have a small enough particle to readily dissolve upon the dilution of the dispersion with additional water. A major utility for these dispersions is in the continuous dyeing of carpet wherein they are directly introduced into a room temperature "make up" tank. It is therefore important that the dyestuffs solids display sufficient "kinetic solubility" to go into solution under the time and thermal constraints of such processes. The speed of dissolution is inversely related to the particle size of the solid in accordance with well established scientific principles of surface energy.

The anionic dispersant used in the dispersions of the present invention may be any of those known to the art. Both U.S. Pat. Nos. 3,770,371 and 4,110,073 contain extensive disclosures of such suitable dispersants which are incorporated herein by reference. Suitable dispersants may be characterized by having a molecular structure wherein a portion of the molecule is particularly compatible with organic material and a portion of the molecule is particularly compatible with water. The water compatibility is imparted by anionic salt groups particularly carboxylate or sulphonate groups. These dispersants are broadly chemically distinguished from the anionic dyestuffs suitable in the present invention by the fact that their organic compatible or lyophyllic molecular portions do not constitute or do not contain chromophores.

Preferred dispersants are those that contain one or more sulphonate groups particularly those in which the counter ion is an alkali metal, and most especially those in which the counter ion is sodium. Especially preferred dispersants are the sulphonated condensation products of naphthalene and formaldehyde and the lignin sulphonates with the latter being the most preferred. Particularly suitable are the lignin sulphonates or derivatives thereof which are sodium salts; have low or no sugar content; have molecular weights between 5000 and 50,000; and have between 0.5 and 5 sulphonic acid groups per 1,000 molecular weight units. Especially preferred lignin sulphonates are the non-staining variety which do not impart substantial coloration to an undyed skein.

Other suitable dispersants include: alkyl sulphonates; sulphonated, unsaturated, fatty acids; sulphonates of polycarboxylic acid esters; alkyl benzene sulphonates; sulphonated aliphatic alcohol; condensation products of ethylene oxide with amines, fatty acids, phenols or alcohols which are then reacted with sulfuric acid and neutralized to form salts which will dissociate in water to give anions. Specific examples of suitable dispersants include sodium dodecylsulphonates, sodium lauryl sulfates, sodium dodecylbenzene sulphonate, dibutyl naphthylene sulphonate, acidic sulfuric acid esters of the condensation products of ethylene oxide with nonyl phenol, sodium dioctylsulfosuccinate, condensation products of cresol, $NaHSO_3$ and formaldehyde, condensation products of 2-hydroxy naphthylene-6-sulfonic acid with formaldehyde, sulphonic acids of condensation products of naphthylene, terphenyl or ditolylether with formaldehyde and condensation products of cyclohexanone with formaldehyde and $NaHSO_3$. All of these anionic dispersants are preferably used as their alkali and/or ammonium salts.

Any electrolyte meeting the classical definition may be suitably utilized in the present invention. Such materials are typically characterized by high water solubility and low molecular weight. The water soluble salts of inorganic or organic mono- or polybasic acids which are described in U.S. Pat. No. 3,770,371 are among the suitable materials referred to as electrolytes in the present application. The alkali metal or ammonium salts are particularly preferred, particularly those of the mineral acids or lower molecular weight organic acids, such as acetic acid or oxalic acid. Salts of hydrochloric acid, sulphuric acid and the various phosphorus based acids are especially preferred. Suitable salts include sodium acetate, lithium chloride, lithium sulphate, sodium chloride, sodium sulphate, potassium chloride, potassium sulphate, ammonium chloride, and ammonium sulphate. Sodium hexametaphosphate is an especially preferred salt because of its ability to increase the compatability of the dispersion of one acid dyestuff with that of another. Of course the most preferred salt in terms of availability and costs is sodium chloride.

All or part of the electrolyte required in the practice of the present invention may be present in the dyestuff as a result of the method of synthesis and isolation. An azo coupling reaction, for example, generates 1 mole of electrolyte by-product per mole of dyestuff. The same is true for dyestuffs derived from bromamine acid. Furthermore, electrolyte may be added to the reaction mixture prior to isolation of the dyestuff in order to ensure complete precipitation of the dyestuff. Finally, dyestuff presscake is typically washed with a weak electrolyte solution in order to remove impurities without dissolving excessive dyestuff. The amount of electrolyte contributed by these three operations will vary from dyestuff to dyestuff and be in the range of approximately 0.5% to 20% of the dry weight of the dyestuff presscake. In this regard the washing of presscake is rarely of sufficient thoroughness to reduce the electrolyte content to the level in the washing solution, i.e. a true equilibrium value is rarely achieved.

The amount of electrolyte used in the practice of the present invention may or may not be sufficient to drive the dyestuff being dispersed completely out of solution. With some dyestuffs, it may be insufficient and in which others it may be greatly in excess. As discussed hereinafter other considerations determine the appropriate electrolyte content in any given dispersion according to the present invention.

The electrolyte may in actual fact, serve a number of functions in the dispersions of the present invention, but its critical functions are to stabilize the dispersed acid dyestuff particles against particle growth and assist in controlling the rheology. The phenomenon of Ostwald ripening, i.e. particle growth, is likely if the dispersion is subject to conditions such as thermal cycling from lower to higher temperatures. The presence of dissolved electrolyte inhibits this phenomonon presumably by decreasing the solubility of the dyestuff in the aqueous suspending medium. The same inhibition can be presumably obtained by using an initially very fine particle size and a high concentration of surfactant, but such an approach results in dispersions having unacceptably high viscosities at low shear rates.

The dispersions of the present invention should have sufficiently low viscosities at low shear rates to be readily pourable, pumpable and handleable by the end user. For example, such products are typically supplied to the market in drums so that it is neither practical nor convenient to apply significant shear to the product before emptying the drum. Many other oprations which could typically be involved in the end use of the dispersions of the present invention indicate the need for a low viscosity at low shear rates, including any operation involving gravity feeding of the dispersion to an application process. The viscosity of the dispersions of the present invention may be conveniently measured in the Brookfield Model LVT Viscometer at a fairly low shear rate. Such low shear rates are typically obtained by utilizing fairly low spindle speeds of less than about 30 rpm. Almost invariably the lower the spindle speed the lower the shear and consequently the higher the viscosity. A speed of 5 rpm provides a convenient screening test although the somewhat higher shear rate obtained at 12 rpm is felt to provide a more realistic approximation of field conditions. In particular, the dispersions of the present invention should have room temperature viscosities at 12 rpm of less than about 4000 cps. Such viscosities characterize dispersions which are readily utilizable in the typical field application for acid dyestuffs.

The low shear viscosities of the dispersions of the present invention can be adjusted through control of the dyestuff content, the dispersant content and the electrolyte content. The higher the dyestuff solid content of the dispersion is the higher the viscosity will be if the other parameters are kept constant.

Dispersion viscosity initially decreases with the addition of a dispersant. Once a minimum value is reached further additions cause an increase. The dispersant content which corresponds to this minimum varies depending on the identity and amount of the dyestuff present. The minimum is typically observed at a dispersant content of between about 0.2 and 5 wt %.

The effect of electrolyte on low shear viscosity follows a similar pattern. The initial addition may cause a lowering of this viscosity but higher levels will cause an increase. The particular behavior depends on the identity and amount of dispersed dyestuff.

The viscosities of the dispersions of the present invention can also be adjusted by the use of art recognized "thickening agents". The thickening agent may serve the dual purposes of adjusting the low shear viscosity and stabilizing the dispersion against settling. The thickening agent can also act to suppress the dispersions tendency to stratify or separate into various layers. Although not required for the purposes of the present invention, a thickening agent may be conveniently used in amounts between about 0.05 and 1.0 weight percent, preferably between about 0.15 and 0.35 wt %. Suitable thickeners include natural gums, such as Guar gum, alginates, locust bean gum, gum arabic, ethyl cellulose products, acrylates, methacrylates, or finely dispersed silica gels, and magnesium or aluminum silicates. A particularly suitable thickening agent is xanthan gum.

The dispersions of the present invention may also include biocides which inhibit or suppress mold and or bacterial growth. Suitable products include sodium pentachlorophenolate, condensation products of paraformaldehyde with aromatic alcohols, specifically benzyl alcohol and solutions of formaldehyde. These biocides may be present in amounts between 0 and 3 weight percent, preferably in amounts between 0.05 and 0.5 weight percent.

The dispersions of the present invention may also include the defoamers known to the dyestuff art. Included among such agents are tributyl phosphate, alkyl succinic acid anyhydride combined with aliphatic alcohol, methylpolysiloxane with $C_2$-$C_4$ alkoxy groups in combination with finely dispersed silica, and water insoluble organic liquids. Among the suitable water insoluble organic liquids are mineral oil, chlorinated mineral oil, liquid trichlorovinyl chloride polymers mixed with hydrophobic, finely dispersed silica and sulphonated petroleum.

Dispersions of the present invention may also incude between 0 and 20 percent, preferably between 5 and 10 weight percent of a humectant. Included among the suitable humectants known to the dyestuff art are formamide and glycol ethers.

Dispersions of the present invention will naturally include any agent used to adjust its pH desired level. Because the acid dyestuffs tend to have an acidic pH in water, such agents will normally display an alkaline pH, i.e. one greater than 7, in water. A particularly suitable and convenient pH control agent is sodium hydroxide.

EXAMPLES

The invention is further illustrated, but is not intended to be limited by the following examples in which all parts and percentages are by weight, unless otherwise specified. Unless otherwise specified the formulations reported in the following working examples were prepared in the following manner:

1. The specified amount of presscake of the specified dye which contains some electrolyte was stirred into an aqueous solution of a specified amount of dispersant and sufficient additional electrolyte to achieve the specified total content;
2. the resulting suspension was homogenized in a Waring Blender;
3. the pH of the suspension was adjusted by the addition of a 20% caustic solution;
4. initial size-reduction of the particle size of the suspended dyestuff solids was by passing the suspension through a rotor-stator colloid mill;
5. further size reduction was by passing the suspension twice through a pressure-cavitational mill at 6000 psi;
6. then, if specified, a biocide was added; and
7. when specified, a xanthan gum was added.

In these Examples all the electrolyte contributed by the presscake was assumed to be sodium chloride although it may have been partially composed of other inorganic halides.

Example 1

A series of dispersions were prepared utilizing 29.1 wt. % of Color Index Acid Blue 324 (Structure I), 6.9 wt. % of sodium chloride and various levels of a sodium lignin sulphonate dispersant with a low sugar content; a molecular weight of between 5000 and 50,000 and 0.5 to 5 sulphonic acid groups per 1000 molecular weight units. The pH of each of these dispersions was adjusted to a value of approximately 7.0. The viscosity obtained at each dispersant level was as follows:

| Weight % Dispersant | Room temperature Viscosity in cps at 5 rpm |
| --- | --- |
| 0.2 | 640 |
| 1.0 | 200 |
| 3.0 | 1600 |
| 5.0 | 5200 |

Example 2

A similar set of dispersions were prepared except that a constant surfactant level of 1 wt. % was utilized and the pH was varied to give the following viscosity values:

| pH of the Dispersion | Room temperature Viscosity in cps at 5 rpm |
| --- | --- |
| 3.4 | 1840 |
| 4.3 | 1440 |
| 4.9 | 1320 |
| 6.5 | 840 |
| 8.3 | 280 |
| 9.6 | 80 |

Example 3

A series of dispersions were prepared utilizing approximately 43.5 wt. % of Color Index Acid Red 337 (Structure II), 12.5 wt. % sodium chloride and varying amounts of the lignin sulphonate utilized in Example 1. The pH of these dispersions was adjusted to a value of approximately 7.0. The values of viscosity obtained at various dispersant loadings was as follows:

| Weight % of Dispersant | Room temperature Viscosity in cps at 5 rpm |
|---|---|
| 0.2 | 8000 |
| 0.5 | 4000 |
| 1.0 | 4000 |
| 3.0 | 12,000 |
| 5.0 | 32,000 |

Example 4

A series of dispersions similar to those of Example 3 were prepared with the distinction that only 39.5 wt. % of the Color Index Acid Red 337 was utilized. The variation of viscosity with dispersant loading was as follows:

| Weight % Dispersant | Viscosity in cps at 5 rpm |
|---|---|
| 0.2 | 1350 |
| 0.5 | 1050 |
| 1.0 | 375 |
| 3.0 | 400 |
| 5.0 | 750 |

Example 5

A series of dispersions prepared utilizing 43.8 wt. % of Color Index Acid Blue 25 (Structure III), 11.2 wt. % sodium chloride and various amounts of the lignin sulphonate used in Example 1. The pH of these dispersions were adjusted to approximately 7.0. The viscosity at room temperature varied with dispersant loading as follows:

| Weight % Dispersant | Room temperature viscosity in cps at 5 rpm |
|---|---|
| 0.05 | 9200 |
| 0.2 | 5800 |
| 0.5 | 2740 |
| 2.75 | 13,500 |
| 5.0 | 15,520 |

Example 6

A series of dispersions similar to those prepared in Example 5 were prepared utilizing a constant dispersant loading of 0.5 wt. % and varying the pH. The variation of room temperature viscosity with pH was as follows:

| pH of the Dispersion | Room temperature viscosity in cps at 5 rpm |
|---|---|
| 3.0 | 6800 |
| 4.0 | 6000 |
| 5.0 | 4000 |
| 6.0 | 7700 |
| 7.0 | 2740 |
| 8.0 | 4600 |
| 9.0 | 8400 |
| 10.0 | 2400 |
| 11.0 | 3200 |

Example 7

A series of dispersions were prepared utilizing 14.2 wt. % of Color Index Acid Blue 40 (Structure IV), and various amounts of both sodium chloride and the lignin sulphonate utilized in Example 1. The pH of these dispersions was adjusted to a value of 5.5. The room temperature viscosity obtained for the various compositions was as follows:

| Weight % Salt | Weight % of Dispersant | Room temperature viscosity in cps at 5 rpm |
|---|---|---|
| 2.8 | 0.2 | 16,000 |
| 2.8 | 1.0 | 44,000 |
| 2.8 | 5.0 | 66,000 |
| 9.3 | 0.2 | 2,600 |
| 9.3 | 1.0 | 7,600 |
| 9.3 | 5.0 | 48,000 |
| 12.8 | 0.2 | 1,280 |
| 12.8 | 1.0 | 1,400 |
| 12.8 | 5.0 | 40,000 |

Example 8

A series of dispersions similar to those of Example 7 were prepared utilizing a salt content of 12.8% and a dispersant content of 0.2%. The room temperature viscosity of these dispersions at various pH values was as follows:

| pH of the Dispersion | Room temperature viscosity cps at 5 rpm |
|---|---|
| 3.0 | 3400 |
| 3.5 | 1250 |
| 4.5 | 800 |
| 5.5 | 1280 |
| 6.0 | 8400 |
| 7.0 | 20,200 |
| 8.0 | 11,480 |
| 9.0 | 9600 |
| 10.0 | 8000 |
| 11.0 | 9700 |
| 12.0 | 14,000 |

EXAMPLE 9

A series of dispersions similar to those of Example 7 were prepared utilizing a sodium chloride content of 9.3 wt. %, with the pH adjusted to a value of 5.5. At a dispersant loading of 0.25 wt. %, the room temperature viscosity in cps at 5 rpm was 2,000, while at a dispersant loading of 1.0 wt. %, the viscosity increased to somewhat over 7000.

Example 10

A dispersion was prepared utilizing 495 parts of a presscake containing 276.8 parts of Color Index Acid Blue 324 (Structure I). 70 parts of a non-staining sodium lignin sulphonate, sufficient sodium chloride to give a total content of 8.2 parts and 433 parts of water were used to prepare this dispersion and the pH was adjusted to a value of 7. Two parts of a biocide were added to the completed dispersion. The resultant dispersion had a room temperature viscosity of 3500 cps at 12 rpm. The dispersed dyestuff solids had a median particle size as determined by Coulter counter of 2 microns.

Example 11

A dispersion was prepared utilizing 595 parts of a presscake containing 298.5 parts of Color Index Acid Blue 25 (Structure III), 25 parts of a lignin sulphonate utilized in Example 1, sufficient sodium chloride to give a total content of 83.5 parts and 300 parts of water in addition to that in the presscake. The dispersion's pH was adjusted to 7.6. Two parts of the same biocide as utilized in Example 10 were added to the dispersion. The finally obtained dispersion had a room temperature viscosity of 126 cps at 12 rpm. However, it had a slight tendency to stratify upon prolonged standing. An addition of 1.5 parts of a xanthan gum was added to increase the viscosity to 2000 cps and inhibit the tendency to stratify.

Example 12

A series of dispersions were made utilizing 675 parts of a presscake containing 233.5 parts of Color Index Acid Orange 156 (Structure V), 15 parts of the lignin sulphonate of Example 1, sufficient sodium chloride to give a total content of 61.5 parts and 148 parts of water. Two parts of the biocide utilized in Example 10 was added to each of the three dispersions prepared. The first dispersion had a room temperature viscosity of 287 cps at 12 rpm. The second dispersion which also contained 1.5 parts of xanthan gum had a viscosity of 925 cps and the third dispersion which contained 2.5 parts of xanthan gum had a viscosity of 1850 cps.

Example 13

A series of dispersions essentially similar to those of Example 12 except that they contained varying amounts of salt and no xanthan gum were prepared. Each of these dispersions initially had a median particle size as determined by Coulter counter of approximately 2½ microns. These dispersions were then aged for 1 week at 50° C. and their particle sizes remeasured with the results as follows:

| Sodium chloride content | Particle size distribution |
| --- | --- |
| 3.6% | 5 micron average particle size with some particles as large as 10 microns. |
| 5.1% | Average particle size of 3½ with some particles as large as 10 microns |
| 6.6% | No shift in the particle size distribution. |
| 8.1% | No shift in the particle size distribution. |
| 9.6% | No shift in the particle size distribution. |

This example demonstrates a technique for determining the appropriate electrolyte content when utilizing particle sizes with dispersant loadings within the teachings of the present invention. Stable dispersions may also be obtained with smaller particle sizes and higher surfactant loadings, but in such cases, it will become difficult to achieve satisfactory low shear viscosities.

Example 14

Two dispersions were prepared utilizing presscake of Color Index Acid Red 266 (Structure VI). In both dispersions, the pH was adjusted to a value of 7.5.

For the first dispersion, 639 parts of a presscake containing 343.6 parts of the dyestuff were utilized. In this case, the presscake was stirred into a solution of 10 grams of the lignin sulphonate utilized in Example 1 in 250 grams of water and sufficient sodium chloride to give a total content of 51.4 parts was added to the dispersion after milling had generated an average particle size of between 2 and 2.5 microns. Two parts of the biocide utilized in Example 10 was added with the sodium chloride. The dispersion had a room temperature viscosity at 12 rpm of 375 cps.

The second dispersion utilizing this dyestuff was formulated as follows:

| | |
| --- | --- |
| 23 | parts of dyestuff solids as presscake |
| 1 | part of a non-staining sodium lignin sulphonate dispersant |
| 1 | part of a phosphate ester |
| 2 | parts sodium chloride |
| 5 | parts sodium hexametaphosphate |
| 0.2 | parts of the biocide used in Example 10 |
| 0.35 | parts of a xanthan gum |
| 67.4 | parts of water. |

The resultant dispersion had a room temperature viscosity of 2000 cps at 12 rpm. The use of the sodium hexametaphosphate as the primary electrolyte is believed to have given this dispersion increased compatibility with dispersions of other acid dyestuffs.

Example 15

A dispersion was prepared utilizing 366 parts of a presscake containing 266.7 parts of Color Index Acid Red 337 (Structure II). Also utilized were 10 grams of the lignin sulphonate used in Example 1; sufficient sodium chloride to give a total content of 153.3 parts; and 474 parts of water. The pH was adjusted to a value of 8. The room temperature viscosity of the dispersion at 12 rpm was 825 cps.

Example 16

A dispersion was prepared utilizing 307 parts of a presscake containing 139.7 parts of Color Index Acid Blue 40 (Structure IV). This presscake was stirred into a solution that contained not only 10 parts of the lignin sulphonate utilized in Example 1 and sufficient sodium chloride to give a total content of 128.3 parts, but also 20 parts of a petroleum sulphonate, 2 parts of the biocide used in Example 10 and 2.5 parts of a defoamer which contained hydrophobic silica, alcohols, and nonionic surfactants. This solution further contained 60 parts of a 20% caustic solution which caused the ultimately formed dispersion to have a pH of 6.5. After the dispersion was homogenized in the blender, it was passed through a rotor stator colloid mill twice to achieve an average particle size of 4.5 microns. The dispersion had a room temperature viscosity at 12 rpm of 1525 cps. Upon the addition of 0.5 parts of a xanthan gum, the viscosity was increased to 2450 cps at 12 rpm.

The major formulation parameters of Examples 10 through 12 and 14 through 16 may be summarized as follows:

TABLE I

| Example | Dyestuff Solids wt % | Electrolyte Content wt % | Dispersant Content wt % | Dyestuff to Electrolyte Ratio | Dyestuff to Dispersant Ratio | Room Temperature Viscosity @ 12 rpm in cps | Solubility By Bleed on Filter Paper |
|---|---|---|---|---|---|---|---|
| 10 | 28.0 | 0.8 | 7 | 35 | 4.00 | 3500 | soluble |
| 11 | 29.9 | 8.4 | 2.5 | 3.56 | 11.96 | 126 | no bleed |
| 12 | 26.8 | 7.0 | 1.7 | 3.8 | 15.8 | 287 | trace |
| 14 | 37.3 | 5.6 | 1.1 | 6.68 | 33.6 | 375 | slight |
| 15 | 27.0 | 15.3 | 1.0 | 1.76 | 27.0 | 825 | trace |
| 16 | 15.2 | 14.0 | 1.1 | 1.09 | 13.8 | 1525 | no bleed |

Commercial size batches of 5000 lbs. of each of the dispersions of Examples 10, 11, and 14 through 16 were prepared and sampled to commercial dyers. In the case of Examples 11 and 16 the xanthan containing formulation was utilized with the 2.5 parts level being utilized in the Example 12 formulation. These materials all performed adequately in continuous commercial carpet dyeing in both Kuesters and foam dyeing equipment and did not display significant stratification or sedimentations after several months in the field. They were all found to be readily pourable, pumpable and handleable in standard application operations. The four dispersions excluding Examples 12 and 16 had a color strength equivalent to 67% of the commercially accepted powdered type equivalent (PTE) while Example 12 was at 56% PTE and Example 16 was at 50% PTE.

Example 17

A dispersion was prepared utilizing 381 parts of a presscake containing 192.7 parts of the dyestuff of Structure VII, 15 parts of the lignin sulphonate of Example 10, sufficient sodium chloride to give a total content of 105.3 parts and 504 parts of water. The dyestuff solids of the ultimately formed dispersion had an average particle size of 2 microns. The dispersion had a room temperature viscosity of 2380 cps at 12 rpm. This dispersion displayed no bleed on filter paper.

Example 18

A series of dispersions were prepared utilizing 596.8 parts of a presscake containing 223.1 parts of Color Index Acid Red 392 (structure VIII), 342.4 parts of water and various levels of sodium chloride and the lignin sulfonate of Example 1. The pH of each of these dispersions was adjusted to a value of between about 3.5 and 3.7. The results were as follows:

| Wt. % Dispersant | Wt. % Electrolyte | Room Temperature Viscosity cps at 12 rpm |
|---|---|---|
| 1 | 6.2 | 1100 |
| 3 | 6.2 | 6750 |
| 5 | 6.2 | 5000 |
| 1 | 9.2 | 620 |
| 3 | 9.2 | 1450 |
| 5 | 9.2 | Too solid to mill |

The dispersion containing 1 wt % dispersant and 5 wt % sodium chloride was found to be too thick to mill when the pH was at a value of about 7.5, and was found to display a trace bleed on filter paper at the 3.5 pH value.

This example demonstrates how increasing the electrolyte level to an optimum value can result in a lowering of the low shear viscosity at a variety of dispersant levels at an optimum pH value.

COMPARISON WITH THE PRIOR ART

Two series of experiments were run to compare the formulations of the present invention to formulations according to the teachings of U.S. Pat. No. 3,770,371 to Bossard and to the teachings of U.S. Pat. No. 4,110,073 to Mollet. The specific teaching of Example 77 of the former patent and Example 10 of the latter patent were utilized. The dyestuff solids of the dispersions according to both of these patents were milled to a particle size below 1 micron which is representative of the result obtained utilizing the glass ball mill referred to in Example 66 of the former patent and Example 10 of the latter patent. Example 77 of the latter patent does not itself contain an explicit description of what milling, if any, was utilized in its preparation. As dyestuffs solids, the two series of tests utilized Color Index Acid Blue 324 and Color Index Acid Blue 25. The Acid Blue 25 was the same dyestuff as was actually utilized in Example 77 of the U.S. Pat. No. 3,770,371; while the Acid Blue 324 was structurally similar to the actual dyestuff utilized in Example 10 of U.S. Pat. No. 4,110,073.

The dispersions according to U.S. Pat. No. 3,770.371 were formulated as follows:

```
116.6  parts of dyestuff
 72.3  parts of sodium chloride
    5  parts of the condensation product of 2
       parts of naphthylene 2 sulphonic acid
       and 1 part of formaldehyde
  516  parts of water
  710  parts total.
```

The dispersions according to Example 10 of U.S. Pat. No. 4,110,073 were formulated as follows:

```
22.65  parts of dyestuff solids
 6.68  parts of dinaphthylene methane
       disulphonic acid
 6.68  parts of sodium lignin sulphonate
 2.65  parts of glycerine
  0.5  parts of dibutylnaphthylene sulphonate
  0.3  parts of sodium pentachlorophenolate
 0.65  sodium chloride
 24.9  parts water
  100  parts total
```

The dispersions representative of the present invention were those of Examples 10 and 11 for Color Index Acid Blue 324 and 25, respectively. The dispersion of the latter example without xanthan gum was utilized.

The room temperature viscosity of each of the three dispersions based on each of the two dyestuffs was measured at several spindle speeds in a Brookfield Model LVT Viscometer and this data was utilized in accordance with the technique of Casson to extrapolate to the viscosity at infinite shear.

The results for the dispersions based upon Color Index Acid Blue 25 were as follows:

TABLE II

| Dispersion Type | Room Temperature Viscosity in cps | | | | At Infinite Shear |
|---|---|---|---|---|---|
| | @ 6 rpm | @ 12 rpm | @ 30 rpm | @ 60 rpm | |
| U.S. Pat. No. 3,770,371 | 8500 | 6750 | 5100 | 3200 | 409 |
| U.S. Pat. No. 4,110,073 | 21,000 | 15500 | 10700 | 6250 | 338 |
| Present invention | 175 | 125 | 85 | 70 | 34 |

The results for the dispersions based upon Color Index Acid Blue 324 were as follows:

TABLE III

| Dispersion Identification | Room Temperature Viscosity in cps | | | | At Infinite Shear |
|---|---|---|---|---|---|
| | @ 6 rpm | @ 12 rpm | @ 30 rpm | @ 60 rpm | |
| U.S. Pat. No. 3,770,371 | 8000 | 6000 | 3400 | 2000 | 127 |
| U.S. Pat. No. 4,110,073 | 23000 | 15000 | 7400 | 4150 | 94 |
| Present invention | 5100 | 3250 | 1600 | 930 | 28 |

These results show that at infinite shear the viscosity of the dispersions prepared according to all three techniques become rather similar but that at lower shear rates the differences are very substantial. The practical consequence is that dispersions prepared according to the present invention are readily pourable and pumpable, while those prepared according to the teachings of the prior art pose very significant difficulties in handling.

The major formulation parameters of the dispersions according to U.S. Pat. Nos. 3,770,371 and 4,110,073 are summarized as follows:

TABLE IV

| Dispersion Identification | Dyestuff Content wt. % | Electrolyte Content wt. % | Dispersant Content wt. % | Dyestuff to Electrolyte Ratio | Dyestuff to Dispersant Ratio | Room Temperature Viscosity @ 12 rpm |
|---|---|---|---|---|---|---|
| U.S. Pat. No. 3,770,371 | 16.4 | 10.2 | 0.7 | 1.61 | 23.4 | 6000–6750 |
| U.S. Pat. No. 4,110,073 | 22.65 | 0.65 | 13.4 | 34.8 | 1.70 | 15000–15500 |

The dyestuffs utilized which were utilized in these Examples had the following chemical structures:

Structure I, Acid Blue 324

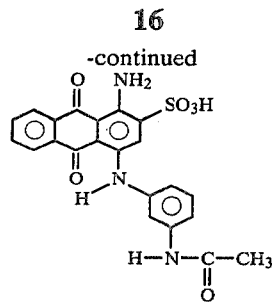

Structure II, Acid Red 337

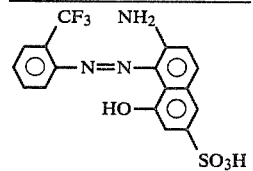

Structure III, Acid Blue 25

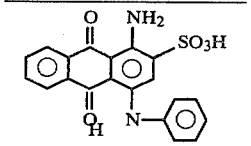

Structure IV, Acid Blue 40

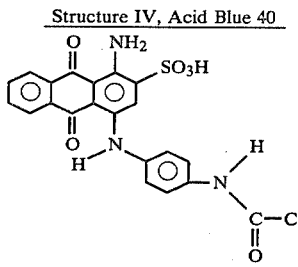

Structure V, Acid Orange 156

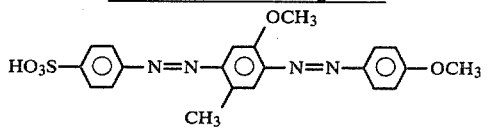

Structure VI, Acid Red 266

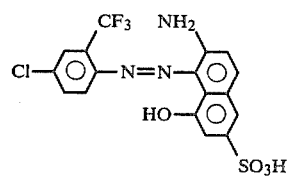

Structure VII

-continued

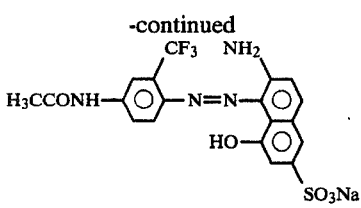

Structure VIII, Acid Red 392

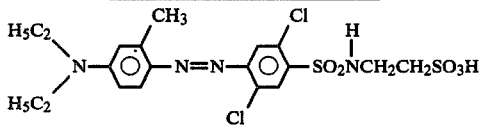

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A non-sedimentating stable aqueous dispersion of a non-metallizable acid dyestuff comprising:
   a. between about 10 and 60 weight percent of dyestuffs solids having an average particle size between about 1 and 10 microns and having no substantial portion of particles less than 1 micron in size;
   b. between about 0.1 and 10 weight percent of an anionic dispersant; and
   c. sufficient electrolytes to keep the dispersion stable; said dispersion having a room temperature viscosity less than about 4000 cps measured with a Brookfield Viscometer at 12 rpm.

2. The dispersion of claim 1 wherein the dispersant is a lignin sulphonate.

3. The dispersion of claim 2 wherein lignin sulphonate is sugar-free or has a low sugar content, has a molecular weight between about 5000 and 50,000; has between about 0.5 and 5 sulphonate group per 1000 molecular weight units; and is at least partially neutralized with sodium.

4. The dispersion of claim 2 wherein the lignin sulphonate is of the non-staining type.

5. The dispersion of claim 2 wherein the lignin sulphonate is a sodium salt.

6. The dispersion of claim 1 wherein the dispersant is the alkali metal or ammonium salt of the sulphonated condensation product of naphthalene and formaldehyde.

7. The dispersion of claim 1 wherein the dispersant is an alkali metal or ammonium salt.

8. The dispersion of claim 1 wherein the electrolyte is the alkali metal or ammonium salt of a low molecular weight organic acid or mineral acid.

9. The dispersion of claim 8 wherein the acid is selected from the group consisting of hydrochloric acid, sulfuric acid and phosphorous acids.

10. The dispersion of claim 1 wherein the electrolyte comprises mainly sodium hexametaphosphate.

11. The dispersion of claim 1 wherein the dyestuff solids have a median particle size between about 1 and 5 microns.

12. The dispersion of claim 1 wherein the dyestuff solids have a median particle size between about 2 and 3 microns.

13. The dispersion of claim 1 wherein the pH of the dispersion has a value greater than about 5.

14. The dispersion of claim 1 wherein the dyestuff is a monosulphonated level dyeing acid dye.

15. The dispersion of claim 14 wherein the dyestuff is selected from the group consisting of Color Index Acid Blue 324, Color Index Acid Red 337, Color Index Acid Blue 25, Color Index Acid Blue 40, Color Index Orange 156, Color Index Acid Red 266 and

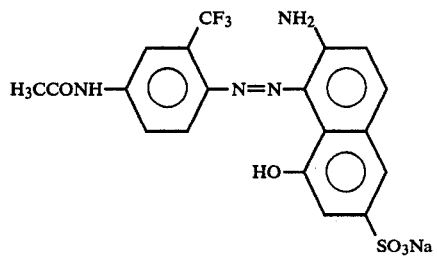

16. The dispersion of claim 15 wherein the median particle size of the dyestuff solids is between about 1 and 5 microns.

17. The dispersion of claim 1 or 15 wherein:
   (a) the dyestuff solids content is between about 14 and 48 wt. %;
   (b) the dispersant content is between 0.2 and 7 wt. %; and
   (c) the electrolyte content is between 0.5 and 16 wt. %.

18. The dispersion of claim 17 wherein the median particle size of the dyestuff solids is between about 1 and 5 microns.

19. The dispersion of claim 18 wherein
   (a) the dyestuff solids content is between about 20 and 45 wt. %; and
   (b) the dispersant content is between about 0.2 and 3 wt. %.

20. The dispersion of claim 1 or 15 wherein:
   (a) the dyestuff to dispersant ratio is between about 3.5 and 35; and
   (b) the dyestuff to electrolyte ratio is between about 1.0 and 40.

21. The dispersion of claim 20 which contains a thickening agent.

22. The dispersion of claim 21 wherein the thickening agent comprises between about 0.05 and 1.0 wt. % of a xanthan gum.

23. The dispersion of claim 20 wherein the pH is adjusted to a value between about 7 and 10.

24. A non-sedimenting stable aqueous dispersion of a non-metallizable acid dyestuff comprising:
   (a) between about 8 and 16 wt. % of Color Index Acid Blue 40 solids having a median particle size of between about 1 and 10 microns and no substantial portion of particles less than 1 micron in size;
   (b) between about 0.1 and 3.0 wt. % of dispersant; and
   (c) between about 8 and 15 wt. % of electrolyte;
said dispersion having a pH between about 3 and 7 and a room temperature viscosity less than about 4000 cps measured with a Brookfield Viscometer at 12 rpm.

25. The dispersion of claim 24 wherein the dispersant comprises a sodium lignin sulphonate and the electrolyte is the salt of a mineral acid or low molecular weight organic acid.

26. The dispersion of claim 25 wherein:
(a) the lignin dispersant has a molecular weight between about 5000 and 50,000; has between 0.5 and 5 sulphonic acid groups per 1000 molecular weight units; and has a low sugar content or is sugar free; and
(b) the electrolyte is an alkali metal salt;
(c) a low level of a defoamer has been included.

27. The dispersion of claim 26 which includes a sulphonated petroleum as an additional dispersant.

28. The dispersion of claim 26 wherein the dispersion contains between about 0.05 and 1.0 wt. % of a xanthan gum.

29. A non-sedimenting, stable, aqueous dispersion of a non-metallizable acid dyestuff comprising:
(a) between about 10 and 47 wt % of Color Index Acid Blue 324 solids having a median particle size of between about 1 and 10 microns and no substantial portion of the particles less than 1 micron in size;
(b) between about 0.2 and 8 wt % of dispersant; and
(c) between about 0.5 and 12 wt % of electrolyte;
said dispersion having a pH between about 4 and 10 and a room temperature viscosity less than about 4,000 cps measured with a Brookfield viscometer at 12 rpm.

30. A non-sedimenting stable, aqueous dispersion of a non-metallizable acid dyestuff comprising:
(a) between about 10 and 47 wt % of Color Index Acid Red 337 solids having a median particle size of between about 1 and 10 microns and no substantial portion of the particles less than 1 micron in size;
(b) between about 0.2 and 5 wt % of dispersant; and
(c) between about 2 and 15 wt % of electrolyte;
said dispersions having a pH between about 4 and 10 and a room temperature viscosity less than about 4,000 cps measured with a Brookfield viscometer at 12 rpm.

31. A non-sedimenting stable, aqueous dispersion of a non-metallizable acid dyestuff comprising:
(a) between about 11 and 51 wt % Color Index Acid Blue 25 solids having a median particle size of between 1 and 10 microns and no substantial portion of the particles less than 1 micron in size;
(b) between about 0.2 and 5 wt % of dispersant; and
(c) between about 2 and 12 wt % of electrolyte;
said dispersion having a pH between about 4 and 10 and a room temperature viscosity less than about 4,000 cps measured with a Brookfield viscometer at 12 rpm.

32. The dispersion of claim 31 which contains a xanthan gum thickening agent.

33. A non-sedimenting stable, aqueous dispersion of non-metallizable acid dyestuff comprising:
(a) between about 10 and 35 wt % of Color Index Acid Orange 156 solids having a median particle size between about 1 and 10 microns and no substantial portion of the particles less than 1 micron in size;
(b) between about 0.2 and 5 wt % of dispersant; and
(c) between about 1 and 12 wt % of electrolyte;
said dispersion having a pH between about 4 and 10 and a room temperature viscosity less than about 4,000 cps measured with a Brookfield viscometer at 12 rpm.

34. The dispersion of claim 33 wherein the dispersion contains between about 0.05 and 1.0 wt % of a xanthan gum thickening agent.

35. The dispersion of claim 33 or 34 wherein the dispersant is a sodium lignin sulphonate and is present at a level of about 1.5 wt %.

36. A non-sedimenting stable aqueous dispersion of non-metallizable acid dyestuff comprising:
(a) between about 9 and 41 wt % of Color Index Acid Red 266 solids having a median particle size of between 1 and 10 microns and no substantial portion of particles less than 1 micron in size;
(b) between about 0.2 and 5.0 wt % of dispersant; and
(c) between about 1 and 7 wt % of electrolyte;
said dispersion having a pH between about 4 and 10 and a room temperature viscosity less than about 4,000 cps measured with a Brookfield viscometer at 12 rpm.

37. The dispersion of claim 36 wherein the dispersion contains between about 0.05 and 1.0 wt % of the xanthan gum thickening agent.

38. A non-sedimenting stable aqueous dispersion of a non-metallizable acid dyestuff comprising:
(a) between about 10 and 26 wt % of dyestuff solids having a median particle size of between 1 and 10 microns and no substantial portion of particles less than 1 micron wherein the dyestuff has the following structure:

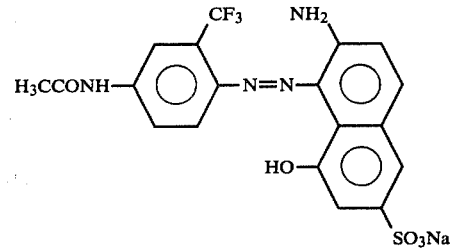

(b) between about 0.2 and 3.0 wt % dispersant; and
(c) between about 5 and 15 wt % of electrolyte;
said dispersion having a pH between about 4 and 10 at a room temperature viscosity less than about 4,000 cps measured with a Brookfield viscometer at 12 rpm.

39. The dispersion of any of claims 29, 30, 31, 33, 36 or 38 wherein the dispersant is a sodium lignin sulphonate which is sugar-free or has a low sugar content; has a molecular weight between about 5000 and 50,000; and has between about 0.5 and 5 sulphonate groups per 100 molecular weight units.

* * * * *